United States Patent
Jang et al.

(10) Patent No.: US 10,448,394 B2
(45) Date of Patent: *Oct. 15, 2019

(54) METHOD AND APPARATUS OF RECEIVING DIFFERENT TYPES OF SUBFRAMES IN MOBILE COMMUNICATION SYSTEM

(71) Applicant: Samsung Electronics Co., Ltd., Suwon-si, Gyeonggi-do (KR)

(72) Inventors: Jae Hyuk Jang, Suwon-si (KR); Kyeong In Jeong, Hwaseong-si (KR); Gert Jan Van Lieshout, Staines (GB); Soeng Hun Kim, Yongin-si (KR); Jin-Kyu Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/873,608

(22) Filed: Jan. 17, 2018

(65) Prior Publication Data

US 2018/0146477 A1    May 24, 2018

Related U.S. Application Data

(63) Continuation of application No. 15/404,971, filed on Jan. 12, 2017, which is a continuation of application (Continued)

(51) Int. Cl.
*H04W 72/04*  (2009.01)
*H04W 76/27*  (2018.01)
(Continued)

(52) U.S. Cl.
CPC ........ *H04W 72/0446* (2013.01); *H04H 20/71* (2013.01); *H04L 12/189* (2013.01);
(Continued)

(58) Field of Classification Search
CPC ............ H04W 72/005; H04W 72/042; H04W 72/0446; H04W 76/14; H04W 76/27;
(Continued)

(56) References Cited

U.S. PATENT DOCUMENTS 9,185,683 B2 * 11/2015 Lee, II ................. H04W 72/005
9,215,054 B2 * 12/2015 Han ..................... H04J 11/0079
(Continued)

FOREIGN PATENT DOCUMENTS

CN    101577858 A    11/2009
CN    101848420 A    9/2010
(Continued)

OTHER PUBLICATIONS

Panasonic, "Transmission mode and RS types supported in Un link", 3GPP TSG RAN WG1 Meeting #64 R1-110776 Taipei, Taiwan, Feb. 21-25, 2011.*
(Continued)

*Primary Examiner* — Jenee Holland
(74) *Attorney, Agent, or Firm* — Jefferson IP Law, LLP

(57) ABSTRACT

A method and base station in a wireless communication system are provided. The method includes transmitting, to a terminal, system information including information associated with a sub-frame configuration of multimedia broadcast multicast service single frequency network (MBSFN) sub-frames, identifying whether the transmission mode of the terminal is a first transmission mode or a second transmission mode, transmitting, to the terminal, dedicated message including configuration information of the identified transmission mode of the terminal, transmitting, to the terminal, control information in a physical downlink control channel (PDCCH) and data in a physical downlink shared channel (PDSCH) in a first sub-frame of the MBSFN sub-frames, if the terminal is configured in the first transmission mode, and
(Continued)

transmitting, to the terminal, the control information in the PDCCH and the data in the PDSCH in a second sub-frame of a non-MBSFN sub-frames, if the terminal is configured in the second transmission mode.

12 Claims, 3 Drawing Sheets

Related U.S. Application Data

No. 14/877,575, filed on Oct. 7, 2015, now Pat. No. 9,578,641, which is a continuation of application No. 14/660,152, filed on Mar. 17, 2015, now Pat. No. 9,420,585, which is a continuation of application No. 14/610,421, filed on Jan. 30, 2015, now Pat. No. 9,426,805, which is a continuation of application No. 13/884,185, filed as application No. PCT/KR2011/008458 on Nov. 8, 2011, now Pat. No. 9,432,992.

(60) Provisional application No. 61/411,115, filed on Nov. 8, 2010.

(51) Int. Cl.
  H04W 76/40 (2018.01)
  H04W 76/14 (2018.01)
  H04W 48/10 (2009.01)
  H04W 4/06 (2009.01)
  H04L 12/18 (2006.01)
  H04W 88/02 (2009.01)
  H04H 20/71 (2008.01)
  H04W 48/00 (2009.01)
  H04W 72/00 (2009.01)
  H04W 52/02 (2009.01)
  H04W 72/12 (2009.01)
  H04W 88/06 (2009.01)
  H04W 88/08 (2009.01)

(52) U.S. Cl.
  CPC ............ H04W 4/06 (2013.01); H04W 48/00 (2013.01); H04W 48/10 (2013.01); H04W 52/0216 (2013.01); H04W 72/005 (2013.01); H04W 72/042 (2013.01); H04W 76/14 (2018.02); H04W 76/27 (2018.02); H04W 76/40 (2018.02); H04W 88/022 (2013.01); H04J 2211/003 (2013.01); H04W 72/1278 (2013.01); H04W 88/06 (2013.01); H04W 88/08 (2013.01); Y02D 70/00 (2018.01); Y02D 70/1262 (2018.01)

(58) Field of Classification Search
  CPC ..... H04W 76/40; H04W 48/00; H04W 48/10; H04W 52/0216; H04W 4/06; H04W 72/1278; H04W 88/06; H04W 88/08; H04L 12/189; Y02D 70/00; Y02D 70/1262
  See application file for complete search history.

(56) References Cited

U.S. PATENT DOCUMENTS

| | | | |
|---|---|---|---|
| 9,510,323 B2* | 11/2016 | Lee, II | H04W 72/005 |
| 2004/0180675 A1 | 9/2004 | Choi et al. | |
| 2006/0268774 A1 | 11/2006 | Kangas et al. | |
| 2007/0086437 A1 | 4/2007 | Difazio et al. | |
| 2009/0252077 A1 | 10/2009 | Khandekar et al. | |
| 2009/0323957 A1* | 12/2009 | Luo | H04J 11/0069 380/270 |
| 2010/0009687 A1 | 1/2010 | Koivisto et al. | |
| 2010/0172311 A1 | 7/2010 | Agrawal et al. | |
| 2010/0189027 A1 | 7/2010 | Ishida et al. | |
| 2010/0195622 A1 | 8/2010 | Buchmayer et al. | |
| 2010/0232346 A1 | 9/2010 | Yu et al. | |
| 2010/0232546 A1 | 9/2010 | Yu et al. | |
| 2010/0238845 A1 | 9/2010 | Love et al. | |
| 2010/0265870 A1 | 10/2010 | Cai et al. | |
| 2010/0273506 A1* | 10/2010 | Stern-Berkowitz | G01S 5/0009 455/456.1 |
| 2010/0285792 A1 | 11/2010 | Chen et al. | |
| 2010/0303013 A1 | 12/2010 | Khandekar et al. | |
| 2010/0322135 A1 | 12/2010 | Van Lieshout et al. | |
| 2010/0323684 A1 | 12/2010 | Cai et al. | |
| 2010/0329171 A1 | 12/2010 | Kuo et al. | |
| 2010/0330992 A1 | 12/2010 | Bhattacharjee | |
| 2011/0013574 A1 | 1/2011 | Hsu | |
| 2011/0053490 A1 | 3/2011 | Wu | |
| 2011/0081854 A1 | 4/2011 | Kuo et al. | |
| 2011/0103291 A1 | 5/2011 | Wiberg et al. | |
| 2011/0110316 A1 | 5/2011 | Chen et al. | |
| 2011/0111781 A1* | 5/2011 | Chen | H04B 7/02 455/507 |
| 2011/0141987 A1 | 6/2011 | Nam et al. | |
| 2011/0170496 A1 | 7/2011 | Fong et al. | |
| 2011/0194477 A1 | 8/2011 | Damnjanovic et al. | |
| 2011/0194478 A1 | 8/2011 | Lee et al. | |
| 2011/0200137 A1 | 8/2011 | Han et al. | |
| 2011/0235584 A1 | 9/2011 | Chen et al. | |
| 2011/0243056 A1 | 10/2011 | Jen | |
| 2011/0267997 A1 | 11/2011 | Seo et al. | |
| 2011/0273994 A1 | 11/2011 | Lin | |
| 2011/0275363 A1 | 11/2011 | Kwon et al. | |
| 2011/0299449 A1 | 12/2011 | Kwon et al. | |
| 2012/0014286 A1 | 1/2012 | Wang et al. | |
| 2012/0033650 A1* | 2/2012 | Ahn | H04L 5/0091 370/336 |
| 2012/0039292 A1 | 2/2012 | Lee et al. | |
| 2012/0082119 A1 | 4/2012 | Chung et al. | |
| 2012/0093051 A1 | 4/2012 | Xu | |
| 2012/0099536 A1 | 4/2012 | Lee et al. | |
| 2012/0122472 A1* | 5/2012 | Krishnamurthy | H04L 5/0053 455/456.1 |
| 2012/0207084 A1 | 8/2012 | Seo et al. | |
| 2012/0213137 A1 | 8/2012 | Jeong et al. | |
| 2013/0039284 A1 | 2/2013 | Marinier et al. | |
| 2013/0044664 A1 | 2/2013 | Nory et al. | |
| 2013/0083736 A1 | 4/2013 | Yin et al. | |
| 2013/0094411 A1* | 4/2013 | Zhang | H04L 5/0048 370/281 |
| 2013/0121216 A1 | 5/2013 | Chen et al. | |
| 2013/0242973 A1 | 9/2013 | Bertrand et al. | |
| 2015/0189622 A1 | 7/2015 | Jang et al. | |
| 2017/0163433 A1* | 6/2017 | Luo | H04W 16/14 |

FOREIGN PATENT DOCUMENTS

| | | |
|---|---|---|
| CN | 102036171 A | 4/2011 |
| JP | 6306104 B2 | 4/2018 |
| WO | 2009-133444 A1 | 11/2009 |
| WO | 2010-082752 A2 | 7/2010 |
| WO | 2010-121194 A1 | 10/2010 |
| WO | 2010-124431 A1 | 11/2010 |
| WO | 2010-127300 A2 | 11/2010 |

OTHER PUBLICATIONS

Dahlman, Erik et al. 3G Evolution: LTE for Mobile Broadband. Elsevier Korea L.L.C., Translated Edition ISBN 9788972838630, Apr. 10, 2010. See section 11.7.

3GPP, '3rd Generation Partnership Project; Technical Specification Group Radio Access Network; Evolved Universal Terrestrial Radio Access (E-UTRA); Physical layer procedures (Relaease 9).' 3GPP TS 36.213 V9.2.0, Jun. 2010. (Retrieved from the Internet on May 17, 2012: < URL: http://www.3gpp.org/ftp/Specs/html-info/36213.htm >) See section 7.

(56) References Cited

OTHER PUBLICATIONS

Samsung, Independent configuration of Rel-10 features, R1-105411, 3GPP, Oct. 5, 2010.
Samsung, Issues on DL RS Design for Higher Order MIMO, R1-084169, 3GPP, Nov. 4, 2008.
NEC Group, Search space design and RE mapping for the Non-interleaved R-PDCCH transmission with CRS and DMRS, R1-104534, 3GPP, Aug. 17, 2010.
LG Electronics Inc., Remaining Issues for PDSCH Starting Point Indication with Cross-Carrier Scheduling, R1-103954, 3GPP, Jun. 23, 2010.
Huawei et al: "Unicast transmission in MBSFN sub frames", 3GPP Draft; R1-093826 Unicast Transmission in MBSFN Subframes, 3rd Generation Partnership Project(3GPP), Mobile Competence Centre; 650, Route Des Lucioles; F-06921 Sophia-Antipolis Cedex; France, no. Miyazaki; Oct. 12, 2009, Oct. 12, 2009, XP050388336.
Samsung, Reception of unicast data over MBSFN subframes, 3GPP TSG-RAN WG2#72 R2-106590, Nov. 15-19, 2010.
Qualcomm Incorporated, Remaining details of PCFICH with cross-carrier scheduling, 3GPP TSG-RAN WG1#61b R1-103530, Jun. 28-Jul. 2, 2010.
CMCC, ZTE, ETRI, Further discussion on deployment of both relay and MBMS, 3GPP TSG-RAN WG2:#71bis R2-105677, Oct. 11-15, 2010.
Nokia Siemens Networks, Nokia, Further Aspects of Control Channel for Relay Backhaul link, 3GPP TSG-RAN WG1#57b R1-092565, 3GPP, Los Angeles, U.S., Jun. 29, 2009.
Japanese Office Action dated Sep. 3, 2018, issued in Japanese Patent Application No. 2017-232438.
Ericsson, R1-080621, Physical-layer parameters to be configured by RRC, 3GPP TSG RAN WG2 #61, 2008.02.0.
Korean Office Action dated Dec. 18, 2018, issued in Korean Patent Application No. 10-2013-7008650.
CMCC, R1-091831, Considerations on eNB-to-Relay backhaul design, 3GPP TSG RAN WG1 #57, Apr. 28, 2009.
Nortel, R1-091384, Discussion paper on the control channel and data channel optimization for relay link, 3GPP TSG RAN WG1 #56bis, Mar. 17, 2009.
Korean Office Action dated Apr. 12, 2019, issued in Korean Patent Application No. 10-2019-7002246.

\* cited by examiner

METHOD AND APPARATUS OF RECEIVING DIFFERENT TYPES OF SUBFRAMES IN MOBILE COMMUNICATION SYSTEM

CROSS-REFERENCE TO RELATED APPLICATION(S)

This is a continuation application of a prior application Ser. No. 15/404,971, filed Jan. 12, 2017; which is a continuation of U.S. patent application Ser. No. 14/877,575, filed Oct. 7, 2015; which is a continuation of U.S. patent application Ser. No. 14/660,152, filed Mar. 17, 2015, which issued as U.S. Pat. No. 9,420,585 on Aug. 16, 2016; which is a continuation of U.S. patent application Ser. No. 14/610,421, filed Jan. 30, 2015, which issued as U.S. Pat. No. 9,426,805 on Aug. 23, 2016; which is a continuation of U.S. patent application Ser. No. 13/884,185, filed on May 8, 2013, which issued as U.S. Pat. No. 9,432,992 on Aug. 30, 2016; which claimed the benefit under 35 U.S.C. § 371 of an International application filed on Nov. 8, 2011, and assigned application number PCT/KR2011/008458; which claimed the benefit of a U.S. Provisional application filed on Nov. 8, 2010, in the U.S. Patent and Trademark Office and assigned Ser. No. 61/411,115; and is related to U.S. patent application Ser. No. 14/877,628, filed Oct. 7, 2015, which issued as U.S. Pat. No. 9,456,445 on Sep. 27, 2016, and is related to U.S. patent application Ser. No. 14/877,492, filed Oct. 7, 2015, which issued as U.S. Pat. No. 9,462,584 on Oct. 4, 2016, the entire disclosures of which are hereby incorporated by reference.

BACKGROUND OF THE INVENTION

Field of the Invention

The present invention relates to a wireless communication system and, in particular, to an operation method and apparatus of a high version (Rel-10) terminal in case of existence of MBSFN subframe supporting unicast in the high version (Rel-10) network of Long Term Evolution (LTE) system in which terminals with different versions (Releases 8, 9, 10, etc.) coexist.

Description of the Related Art

With the rapid advance of the wireless communication technology, the communication systems have evolved to the 4th Generation mobile communication system represented by LTE system. In the LTE system, the data is transmitted in unit of frame having a length of 10 msec, a frame consisting of 10 subframes.

FIG. 1 is a diagram illustrating a structure of a downlink frame used in the LTE system.

In FIG. 1, the frame 101 consists of 10 subframes 103 including normal subframes 150 carrying normal data and Multimedia Broadcast multicast service Single Frequency Network (MBSFN) subframes 107. The normal and MBSFN subframes differ from each other in number of Orthogonal Frequency Division Multiplexing (OFDM) symbols, length of Cyclic Prefix (CP), and structure and number of Cell-specific Reference Signal (CRS), and the MBMS subframe is used only for the purpose of transmitting broadcast and multicast data in Rel-8 and Rel-9 systems. As the system evolves, however, the MBSFN subframe can be used for the purpose of unicast transmission to a specific terminal as well as broadcast/multicast in the LTE Rel-10 or later.

For unicast data transmission/reception, the resource allocation information indicating the resource allocated for transmission/reception is carried on the Physical Downlink Control Channel (PDCCH) and the real data is carried on the Physical Downlink Shared Channel (PDSCH). The terminal determines whether there is any resource allocation information addressed thereto on the PDCCH before attempt receiving real data.

In this case, the LTE Rel-10 terminal has to check the PDCCH carrying the resource allocation information for the MBSFN subframe in order to receive PDSCH through even the MBSFN subframe. However, if the LTE Rel-10 terminal has to check PDCCH in every MBSFN subframe, this may cause unnecessary operation depending on whether the MBSFN subframe carries terminal-specific unicast data or multicast/broadcast data.

SUMMARY

The present disclosure has been made in an effort to address this problem, and it is an object of the present disclosure to provide a method for a terminal to receive data in a situation where different type subframes exist in the wireless communication system including networks operating with different versions of LTE.

In the case that the new version (Rel-10 or later) terminal is in a new version network, the terminal receives information on whether PDSCH reception over MBSFN subframe through broadcast or unicast is supportable from the new version network and, if supportable, takes operation for interpreting PDCCH for receiving PDSCH over MBSFN subframe and, otherwise if not supportable, skips corresponding operation in MBSFN subframe.

In the disclosed method, the new version terminal operating in a new version network reduces unnecessary operation for data reception when unicast data transmission is not supported in the network, depending on whether the network supports unicast data transmission in MBSFN subframe, resulting in reduction of power consumption.

In accordance with an aspect of the present invention, a method by a base station in a wireless communication system is provided. The method includes transmitting, to a terminal, system information including information associated with a sub-frame configuration of multimedia broadcast multicast service single frequency network (MBSFN) sub-frames, identifying whether the transmission mode of the terminal is a first transmission mode or a second transmission mode, transmitting, to the terminal, dedicated message including configuration information of the identified transmission mode of the terminal, transmitting, to the terminal, control information in a physical downlink control channel (PDCCH) and data in a physical downlink shared channel (PDSCH) in a first sub-frame of the MBSFN sub-frames, if the terminal is configured in the first transmission mode, and transmitting, to the terminal, the control information in the PDCCH and the data in the PDSCH in a second sub-frame of a non-MBSFN sub-frames, if the terminal is configured in the second transmission mode.

In accordance with an aspect of the present invention, a base station in a wireless communication system is provided. The base station includes a transceiver and a controller. The transceiver is for transmitting and receiving signals. The controller is configured to control to transmit, to a terminal, system information including information associated with a sub-frame configuration of multimedia broadcast multicast service single frequency network (MBSFN) sub-frame, identify whether the transmission mode of the terminal is a first transmission mode or a second transmission mode, transmit, to the terminal, dedicated message including configuration information of the identified transmission mode of the terminal, transmit, to the terminal, control information in a physical downlink control channel (PDCCH) and data in a physical downlink shared channel (PDSCH) in a first sub-frame of the MBSFN sub-frames, if the terminal is configured in the first transmission mode, and transmit, to the terminal, the control information in the PDCCH and the data in the PDSCH in a second sub-frame of a non-MBSFN sub-frames, if the terminal is configured in the second transmission mode.

DETAILED DESCRIPTION OF EXEMPLARY EMBODIMENTS

In the following, detailed description of well-known functions and structures incorporated herein may be omitted to avoid obscuring the subject matter of the present invention. Exemplary embodiments of the present invention are described with reference to the accompanying drawings in detail.

In the present disclosure, the description is directed to the LTE system for convenience purpose.

There are several releases of LTE and among them the legacy Rel-8 and Rel-9 do not support PDSCH reception in MBSFN subframe. Accordingly, the legacy terminal does not attempt decoding PDCCH for receiving Downlink Control Information (DCI) including PDSCH scheduling information for receiving PDSCH in MBSFN subframe.

In the Rel-10 or later system, however, it is allowed to transmit PDSCH in MBSFN subframe. In this case, unlike the legacy terminal which takes no action for MBSFN subframe because it cannot receive PDSCH in MBSFN subframe, the new terminal has to take an action for receiving PDSCH to acquire DCI including scheduling information for receiving PDSCH in MBSFN subframe. In the following description, new terminal denotes an LTE Rel-10 terminal, i.e. the terminal capable of receiving PDSCH in MBSFN subframes.

Figure 1:
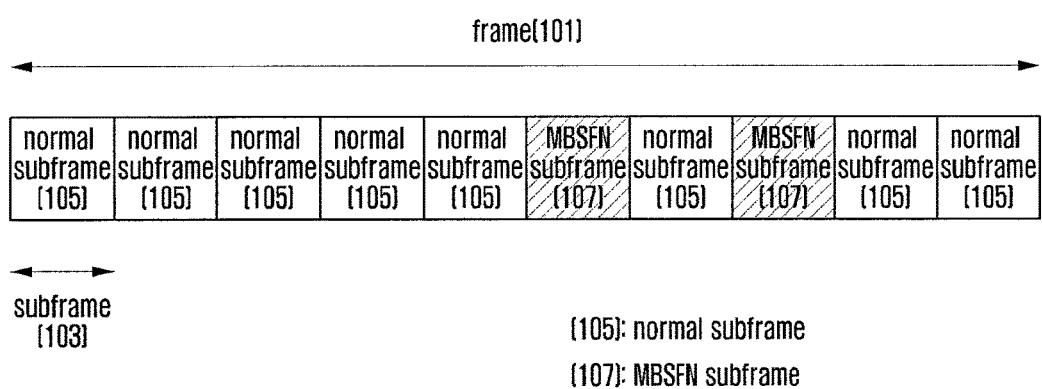
FIG. 1 is a diagram illustrating a structure of a downlink frame used in the LTE system.
Figure 2:
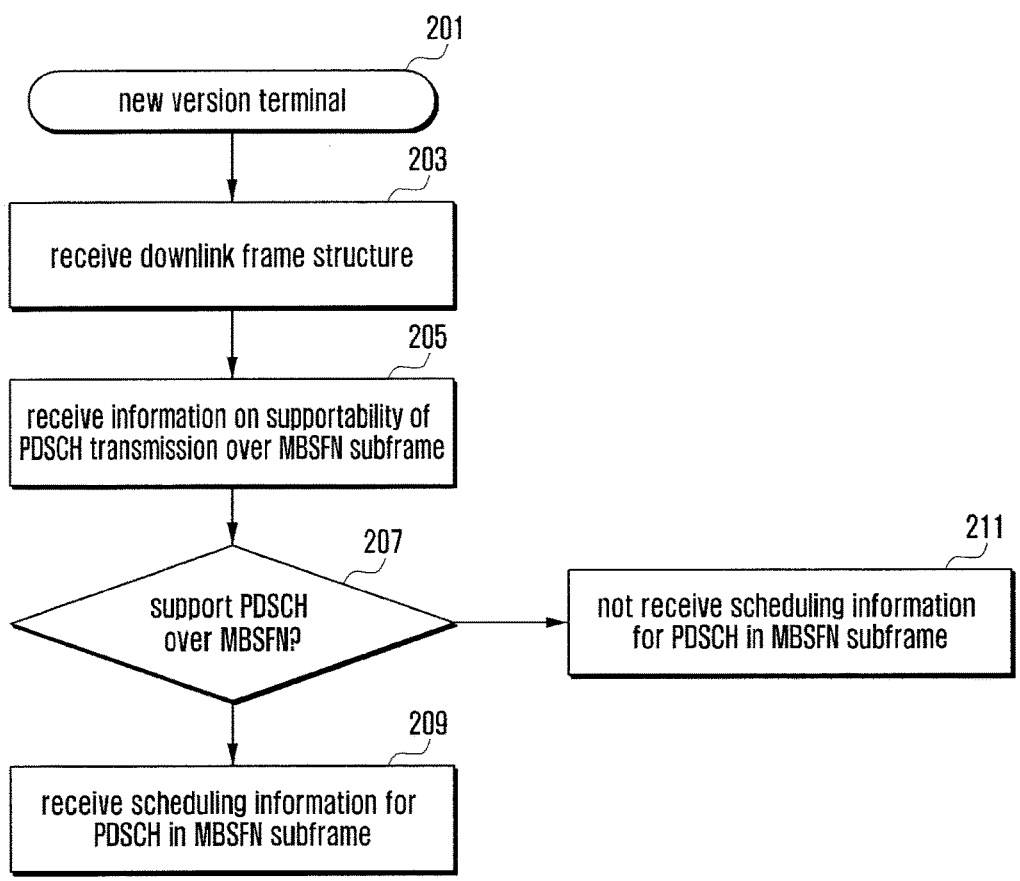
FIG. 2 is a flowchart illustrating the new terminal procedure in the method according to an embodiment of the present invention.

FIG. 2 is a flowchart illustrating the new terminal procedure in the method according to an embodiment of the present invention.

The new version terminal receives a downlink frame structure in System Information Block broadcast by a base station at step 203. The downlink frame structure is transmitted in the form of a bitmap indicating positions of MBSFN subframes.

Next, the terminal receives information on whether the base station supports PDSCH over MBSFN subframe at step 205. The PDSCH over MBSFN subframe supportability can be broadcasted in the system information of the base station or transmitted to the individual terminals through respective control messages. The PDSCH over MBSFN subframe supportability information can be transmitted in a Radio Resource Control (RRC) message explicitly with a newly defined indicator or implicitly with a legacy information (e.g. predefined channel configuration information, transmission mode information, etc.). Steps 203 and 250 can be performed in opposite order. In the case of legacy network or legacy base station, the supportability information on PDSCH over MBSFN is not transmitted. If no supportability information on PDSCH over MBSFN is received, the UE assumes that the base station does not support PDSCH of MBSFN.

If it is determined at step 207 that PDSCH over MBSFN subframe is supported, the UE receives PDCCH including DCI, at step 209, for receiving PDSCH in MBSFN subframes based on the information received at step 205.

If it is determined at step 207 that PDSCH over MBSFN subframe is not supported or if no supportability information on PDSCH over MBSFN subframe is received, the terminal takes no action for receiving PDSCH in MBSFN subframe. In this case, the terminal does not perform any operation for receiving PDSCH.

PDSCH can be transmitted to Rel-10 UEs in MBSFN subframes. In this disclosure, it will be discussed that whether there needs any RRC information in order to support that behaviour more efficiently.

PDSCH can be transmitted to Rel-10 UEs in MBSFN subframes. However due to the following reasons, PDSCH may not be transmitted in all or certain MBSFN subframes under the eNB.

- An eNB does not support unicast-data over MBSFN subframes, e.g. Rel8/9 eNBs.

- Certain MBSFN subframes are already used for other purposes such as MBSFN transmission, PRS transmission, etc.

- An eNB scheduler can decide not to use MBSFN subframes for unicast data.

Without the knowledge to distinguish the cases above, the Rel-10 UE needs to monitor PDCCH to detect DL assignment DCI in every MBSFN subframe. This UE behavior would lead unnecessary power consumption of the UE due to additional blind decodes of PDCCHs compared to Rel-8/9. Therefore, it would be good if RRC signaling is used to inform the Rel-10 UE whether this behavior is supported or not in the eNB. If it is signaled as "not support", then the Rel-10 UE would not perform blind decodes of PDCCHs in order to detect DL assignment DCI in the configured MBSFN subframes. Meanwhile, the Rel-10 UE would perform blind decodes of PDCCHs in order to detect DL assignment DCI in the configured MBSFN subframes only when it is signaled as "support".

Proposal 1: RRC should inform whether unicast data over MBSFN subframe is supported or not.

Overall procedure:

1-bit information (e.g. Support of unicast over MBSFN subframe) would be included in the system information/UE dedicated message (from the eNB to the cell or the UE).

If the information is TRUE:

The Rel-10 UE will perform additional blind decodes of PDCCHs in order to detect DL assignment DCI in every MBSFN subframe (in addition to UL assignment DCI).

Meanwhile if the information is FALSE:

The Rel-10 UE does not need to perform additional blind decodes of PDCCHs in order to detect DL assignment DCI in any MBSFN subframe. (The Rel-10 UE will follow the Rel-8/9 UE behavior, i.e. do blind decodes of PDCCH only to detect UL assignment DCI in all MBSFN subframe).

However, the above proposal mainly solves the case i) only. If unicast data over MBSFN subframe is supported, e.g. Rel10 eNB, the Rel-10 UE should do additional blind decodes of PDCCHs over all MBSFN subframes although only some MBSFN subframes are used for actual unicast-data due to ii) or iii) reasons. Thus, it may be better to signal which MBSFN subframes are actually used for unicast data. Then the Rel-10 UE will only do additional blind decodes of PDCCHs over the indicated MBSFN subframes. However, it is also true it would increase the size of the information.

Proposal 2: RRC should inform which MBSFN subframes are used for unicast data.

Overall procedure:

Following information (e.g. MBSFN-SubframeConfigList-PDSCH-r10) would be included in the system information/UE dedicated message (from the eNB to the cell or the UE).

```
MBSFN-SubframeConfigList-PDSCH-r10    ::=SEQUENCE
    MBSFN-SubframeConfigIndex INTEGER (0. . . n)
    subframeAllocation-PDSCH BIT STRING (0..m)
}
```

The UE behavior:

Check the MBSFN-SubframeConfigIndex value and the corresponding radioframeAllocationPeriod, radioframeAllocationOffset, and subframeAllocation. MBSFN-SubframeConfigIndex information is to know MBSFN subframe configuration, i.e. which subframe is configured for MBSFN-subframe.

Then check the subframeAllocation-PDSCH. The bit order is same as subframeAllocation in MBSFN-SubframeConfig. If it is "1", this means corresponding MBSFN subframe can be used for PDSCH transmission. So, the Rel-10 UE will perform additional blind decodes of PDCCHs in order to detect DL assignment DCI in this MBSFN subframe (in addition to UL assignment DCI). If it is "0", this means corresponding MBSFN subframe is not be used for PDSCH transmission. So, the Rel-10 UE will follow the Rel-8/9 UE behavior, i.e. do blind decodes of PDCCH only to detect UL assignment DCI, in this MBSFN subframe.

This information can be signaled either by system information or UE dedicated message. Considering the following aspects, we assume it is more reasonable to send this information by system information.

MBSFN subframe configuration information is broadcasted by system information.

Rel-10 UEs would use CSI-RS in MBSFN subframe where PDSCH is transmitted and RAN1 has agreed CSI-RS configuration information is cell specific so it would be broadcasted by system information.

Proposal 3: This information is signaled by system information.

Possible extensions:

In this document, we have divided 2 level of blind decodes (i.e. blind decodes for DL assignment in addition to UL assignment or blind decodes only for UL assignment) to be performed dependent on the signaling.

However, we can extend it into multiple levels of blind decodes for future use.

Figure 3:
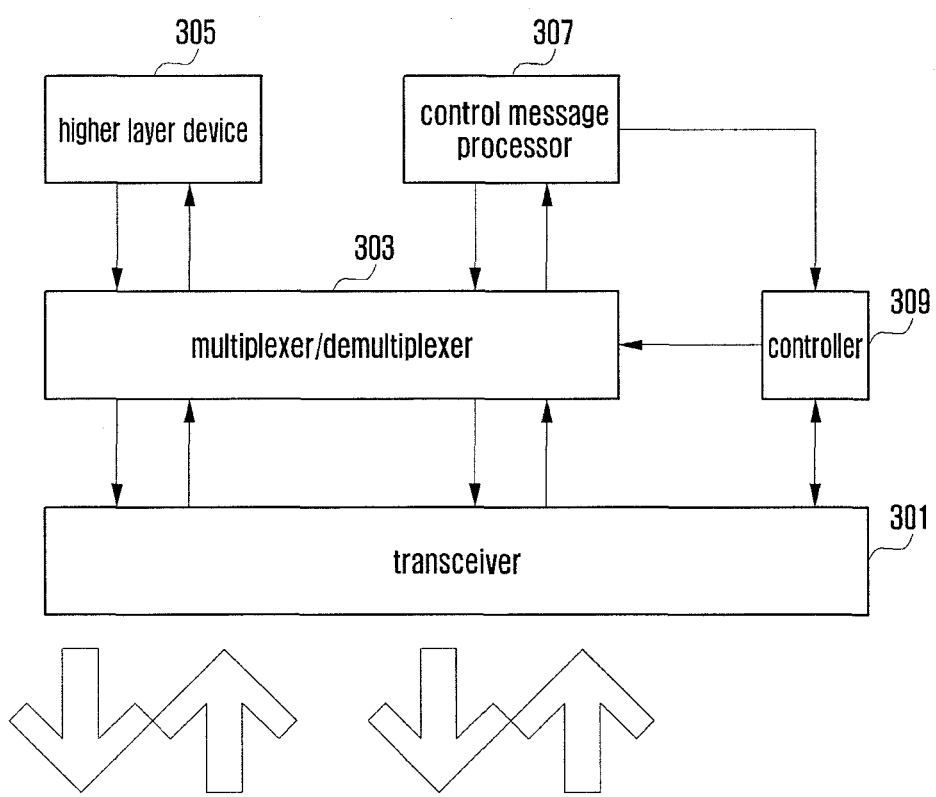
FIG. 3 is a block diagram illustrating the configuration of the terminal according to an embodiment of the present invention.

For example, group A of blind decodes, group B of blind decodes, and group C of blind decodes. In the case, the signaling should be extended to inform whether group A of blind decodes in certain subframes (e.g. MBSFN subframes) is supported/which subframe is actually used for group A blind decodes, or group B of blind decodes in certain subframes (e.g. MBSFN subframes) is supported/which subframe is actually used for group B blind decodes, or group C of blind decodes in certain subframes (e.g. MBSFN subframes) is supported/which subframe is actually used for group C blind decodes. Then the UE would do the corresponding blind decodes in the indicated subframes FIG. 3 is a block diagram illustrating the configuration of the terminal according to an embodiment of the present invention.

The terminal communicates data with higher layer 305 and transmits/receives control messages through a control message processor 207. The terminal multiplexes the control signals or data by means of the multiplexer/demultiplexer 303 and transmits the multiplex result by means of the transceiver 301 under the control of the controller 309. The terminal demultiplexes the physical signal received by the transceiver 301, by means of the multiplexer/demultiplexer 303, and transfers the demultiplexed signals to the higher layer 305 or control message processor 307 under the control of the controller 309.

In the present disclosure, the terminal receives MBSFN subframe configuration information broadcasted by the base station and receives the supportability information on PDSCH over MBSFN subframe through broadcast or unicast. Such a control message is received, the control message processor 307 transfers to the controller 309 the information on whether each subframe is normal or MBSFN subframe and whether PDSCH over MBSFN subframe is supported in order to determine whether to receive PDCCH for receiving PDSCH at every subframe. That is, if PDSCH over MBSFN subframe is supported, the terminal performs operation for receiving PDSCH even in MBSFN subframes and, otherwise PDSCH over MBSFN subframe is not supported, performs no action for receiving PDSCH in MBSFN subframes.

Although the block diagram of the terminal is directed to the case where the function blocks are responsible for different functions, the present invention is not limited thereto. For example, the controller 309 may perform the functions of the control message processor 307.

In the disclosed method, the network notifies the new version terminal whether it supports PDSCH over MBSFN subframe so as to avoid unnecessary reception operation for receiving PDSCH over MBSFN subframe, resulting in reduction of power consumption.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method by a terminal in a wireless communication system, the method comprising:

receiving, at the terminal, system information including information associated with a sub-frame configuration of a multimedia broadcast multicast service single frequency network (MBSFN) sub-frame;

receiving, at the terminal, a dedicated message including information to be used for identifying whether to detect a physical downlink control channel (PDCCH) in a sub-frame of an MBSFN sub-frame for decoding a physical downlink shared channel (PDSCH) in the sub-frame of the MBSFN sub-frame;

determining whether to detect the PDCCH in the sub-frame of the MBSFN sub-frame for decoding the PDSCH in the sub-frame of the MBSFN sub-frame based on the information;

identifying whether the sub-frame of the MBSFN sub-frame is used for an MBSFN transmission or a positioning reference signal transmission;

in case that the terminal determines to detect the PDCCH in the sub-frame of the MBSFN sub-frame for decoding the PDSCH in the sub-frame of the MBSFN sub-frame, performing detection of the PDCCH in the sub-frame of the MBSFN sub-frame except that the sub-frame is used for the MBSFN transmission or the positioning reference signal transmission; and in case that the terminal determines not to detect the PDCCH in the sub-frame of the MBSFN sub-frame for decoding the PDSCH in the sub-frame of the MBSFN sub-frame, not performing detection of the PDCCH in the sub-frame of the MBSFN sub-frame for decoding the PDSCH.

2. The method of claim 1, further comprising:

in case that the terminal determines to detect the PDCCH in the sub-frame of the MBSFN sub-frame for decoding the PDSCH in the sub-frame of the MBSFN sub-frame, decoding the PDSCH in the sub-frame of the MBSFN sub-frame.

3. The method of claim 1, further comprising:

receiving downlink control information including PDSCH scheduling information for receiving the PDSCH in the sub-frame of the MBSFN sub-frame based on detection of the PDCCH in the sub-frame of the MBSFN sub-frame.

4. The method of claim 1, wherein the dedicated message is included in a radio resource control (RRC) message.

5. The method of claim 1, wherein the terminal supports receiving the PDSCH in the sub-frame of the MBSFN sub-frame, in case that the terminal determines to detect the PDCCH in the sub-frame of the MBSFN sub-frame for decoding the PDSCH in the sub-frame of the MB SFN sub-frame.

6. The method of claim 1, wherein a Rel-10 version allows to transmit the PDSCH in the sub-frame of the MBSFN sub-fame.

7. A terminal in a wireless communication system, the terminal comprising:

a transceiver for transmitting and receiving signals; and
a controller configured to:
  receive, via the transceiver, system information including information associated with a sub-frame configuration of a multimedia broadcast multicast service single frequency network (MBSFN) sub-frame,
  receive, via the transceiver, a dedicated message including information to be used for identifying whether to detect a physical downlink control channel (PDCCH) in a sub-frame of an MBSFN sub-frame for decoding a physical downlink shared channel (PDSCH) in the sub-frame of the MBSFN sub-frame,
  determine whether to detect the PDCCH in the sub-frame of the MBSFN sub-frame for decoding the PDSCH in the sub-frame of the MBSFN sub-frame based on the information,
  identify whether the sub-frame of the MBSFN sub-frame is used for an MBSFN transmission or a positioning reference signal transmission,
  in case that the controller determines to detect the PDCCH in the sub-frame of the MBSFN sub-frame for decoding the PDSCH in the sub-frame of the MBSFN sub-frame, perform detection of the PDCCH in the sub-frame of the MBSFN sub-frame except that the sub-frame is used for the MBSFN transmission or the positioning reference signal transmission, and
  in case that the controller determines not to detect the PDCCH in the sub-frame of the MBSFN sub-frame for decoding the PDSCH in the sub-frame of the MBSFN sub-frame, not perform detection of the PDCCH in the sub-frame of the MBSFN sub-frame for decoding the PDSCH.

8. The terminal of claim 7, wherein the transceiver is further configured to decode the PDSCH in the sub-frame of the MBSFN sub-frame in case that the controller determines to detect the PDCCH in the sub-frame of the MBSFN sub-frame for decoding the PDSCH in the sub-frame of the MBSFN sub-frame.

9. The terminal of claim 7, wherein the controller is further configured to:

receive downlink control information including PDSCH scheduling information for receiving the PDSCH in the sub-frame of the MBSFN sub-frame based on detection of the PDCCH in the sub-frame of the MBSFN sub-frame.

10. The terminal of claim 7, wherein the dedicated message is included in a radio resource control (RRC) message.

11. The terminal of claim 7, wherein the terminal supports receiving the PDSCH in the sub-frame of the MBSFN sub-frame, in case that the controller determines to detect the PDCCH in the sub-frame of the MBSFN sub-frame for decoding the PDSCH in the sub-frame of the MBSFN sub-frame.

12. The terminal of claim 7, wherein a Rel-10 version allows to transmit the PDSCH in the sub-frame of the MBSFN sub-fame.

* * * * *